(12) United States Patent
Iguchi et al.

(10) Patent No.: US 9,760,761 B2
(45) Date of Patent: Sep. 12, 2017

(54) IMAGE PROCESSING METHOD AND IMAGE PROCESSING APPARATUS

(71) Applicant: CANON KABUSHIKI KAISHA, Tokyo (JP)

(72) Inventors: Ryosuke Iguchi, Kawasaki (JP); Kiyoshi Umeda, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 45 days.

(21) Appl. No.: 14/268,139

(22) Filed: May 2, 2014

(65) Prior Publication Data

US 2014/0240535 A1    Aug. 28, 2014

Related U.S. Application Data

(63) Continuation of application No. 12/185,554, filed on Aug. 4, 2008, now Pat. No. 8,750,609.

(30) Foreign Application Priority Data

Aug. 10, 2007   (JP) .................. 2007-210296

(51) Int. Cl.
| | |
|---|---|
| *H04N 1/60* | (2006.01) |
| *H04N 1/62* | (2006.01) |
| *H04N 9/68* | (2006.01) |
| *H04N 5/202* | (2006.01) |
| *H04N 9/64* | (2006.01) |
| *H04N 9/73* | (2006.01) |
| *H04N 9/69* | (2006.01) |
| *G06K 9/46* | (2006.01) |
| *G06K 9/00* | (2006.01) |

(52) U.S. Cl.
CPC ......... *G06K 9/00234* (2013.01); *H04N 1/608* (2013.01); *H04N 1/62* (2013.01); *H04N 1/628* (2013.01); *H04N 9/643* (2013.01); *H04N 9/73* (2013.01)

(58) Field of Classification Search
CPC ........ H04N 9/643; H04N 9/73; H04N 1/6027; H04N 1/628; H04N 1/6077; H04N 9/68; H04N 5/202; H04N 9/69; H04N 1/608; H04N 1/62; G09G 2320/0673; G09G 2320/066; G09G 2320/0626; G09G 2320/0271; G06T 7/408; G06T 2207/30201; G06K 9/4652; G06K 9/00234

See application file for complete search history.

(56) References Cited

U.S. PATENT DOCUMENTS

| | | | |
|---|---|---|---|
| 7,583,403 B2* | 9/2009 | Ito ........................ | H04N 1/62 358/1.9 |
| 2003/0174216 A1* | 9/2003 | Iguchi .................. | H04N 1/4074 348/223.1 |
| 2005/0117026 A1* | 6/2005 | Koizumi ............. | H04N 1/6077 348/222.1 |

(Continued)

*Primary Examiner* — Kenny Cese
(74) *Attorney, Agent, or Firm* — Cowan, Liebowitz & Latman, P.C.

(57) ABSTRACT

An amount of color correction of a facial region is modified based on changes caused in face average values by white balance correction. Also, the amount of color correction of the facial region is modified according to luminance of pixels of interest to perform optimum color correction on the facial region and a highlight region.

13 Claims, 7 Drawing Sheets

(56) References Cited

U.S. PATENT DOCUMENTS

| | | | |
|---|---|---|---|
| 2006/0066912 A1* | 3/2006 | Kagaya | H04N 1/628 358/302 |
| 2006/0078216 A1* | 4/2006 | Kaku | H04N 9/735 382/254 |
| 2006/0158704 A1* | 7/2006 | Kameyama | H04N 1/62 358/518 |
| 2006/0176400 A1* | 8/2006 | Shimizu | G06T 7/408 348/570 |
| 2006/0222242 A1* | 10/2006 | Hayaishi | H04N 1/628 382/167 |
| 2006/0257022 A1* | 11/2006 | Hayaishi | H04N 1/6077 382/167 |
| 2007/0177038 A1* | 8/2007 | Nakamura | H04N 5/243 348/241 |

* cited by examiner

FACIAL REGION

FIG. 6

LUMINANCE VALUE

IMAGE PROCESSING METHOD AND IMAGE PROCESSING APPARATUS

CROSS-REFERENCE TO RELATED APPLICATIONS

This application is a continuation of application Ser. No. 12/185,554, filed Aug. 4, 2008, the entire disclosure of which is hereby incorporated by reference.

BACKGROUND OF THE INVENTION

Field of the Invention

The present invention relates to an image processing method and image processing apparatus which perform color correction of a facial region after color correction of an image.

Description of the Related Art

Recently, the spread of digital cameras and personal computers has made it possible for users to capture pictures into a personal computer as digital images and freely perform image processing using application software which corrects images.

The image processing includes correction used to increase brightness of, for example, an underexposed dark image and correction used to change flesh color affected by a color cast into appropriate flesh color.

Against this background, more accurate image processing techniques have recently become necessary. In particular, advancement in object extraction techniques has made it possible to automatically detect human faces in an image. Consequently, many techniques have been proposed for determining feature values in a facial region of a person and correcting brightness and colors of the image appropriately according to the feature values.

For example, Japanese Patent Laid-Open No. 2001-148863 proposes a technique which detects flesh color of a person in an image and determines hue difference between the flesh color subjected to white balance correction and a target color, before performing white balance correction of the image using a highlight point in the image. If the hue difference is decreased, the technique performs white balance correction, but if the hue difference is increased, the technique does not perform white balance correction.

However, the conventional method described above has a problem in that results of correction vary greatly with the accuracy of face detection because white balance correction is not performed if the flesh color of a person deviates even slightly from the target color. Besides, it is not always possible to make the flesh color of a person match the target color by white balance correction alone.

SUMMARY OF THE INVENTION

An object of the present invention is to perform a first color correction on an image based on feature values of the image, perform a second color correction on a facial region based on feature values of the facial region, and thereby perform appropriate color correction on the image and facial region.

Another object of the present invention is to determine amounts of the first and second color corrections based on a distance between a color of the facial region after the first color correction and a target color, and thereby minimize errors in detection.

Another object of the present invention is to maintain the corrected color in non-facial regions after the first correction by changing the amount of correction in the second color correction according to luminance.

According to one aspect of the present invention, there is provided an image processing method which performs color correction of a facial region contained in an image after performing color correction of the image, comprising: performing the color correction of the image based on feature values of the image; and performing the color correction of a facial region by modifying an amount of color correction of the facial region based on predetermined values as well as on feature values of the facial region obtained before and after the color correction of the image.

According to another aspect of the present invention, there is provided an image processing apparatus which performs color correction of a facial region contained in an image after performing color correction of the image, comprising: a unit which performs the color correction of the image based on feature values of the image; and a unit which performs the color correction of a facial region by modifying an amount of color correction of the facial region based on predetermined values as well as on feature values of the facial region obtained before and after the color correction of the image.

Further features of the present invention will become apparent from the following description of exemplary embodiments (with reference to the attached drawings).

DESCRIPTION OF THE EMBODIMENTS

The best mode for carrying out the invention will be described below in detail with reference to the drawings.

Figure 1:
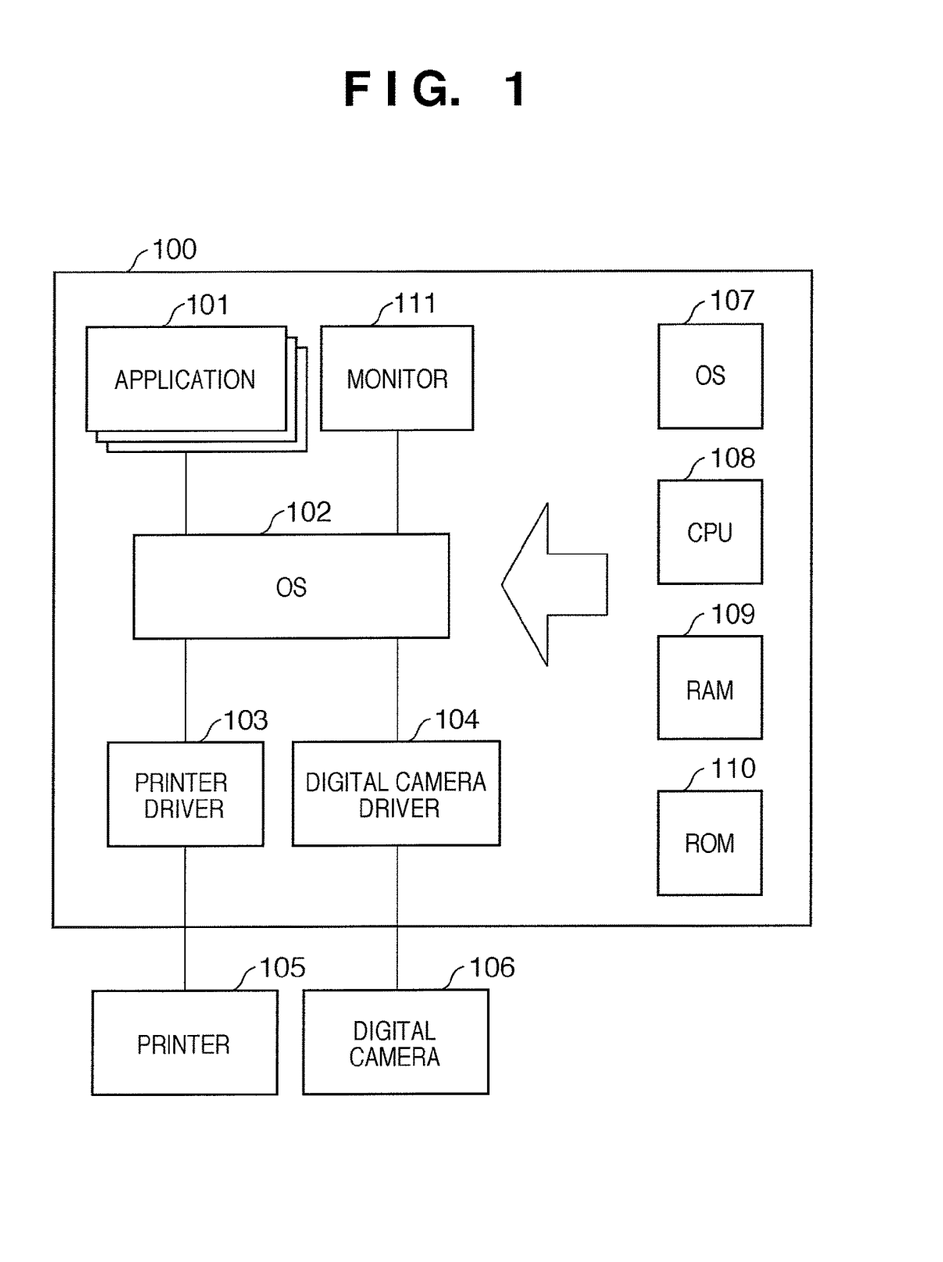
FIG. 1 is a diagram showing a configuration example of an image processing system according to an embodiment of the present invention.

FIG. 1 is a diagram showing a configuration example of an image processing system according to an embodiment of the present invention. The image processing system includes a personal computer 100, digital camera 106, and a printer 105 such as an inkjet printer, where the personal computer 100 serves as a host computer and the digital camera 106 serves as an image pickup apparatus.

The personal computer 100 includes applications 101 such as image processing, word processing, spreadsheet, and Internet browser software; an OS (operating system) 102; and a monitor 111. Also, a printer driver 103 has been installed as software to create print data by processing a drawing command group which, being issued to the OS 102 by the applications 101, represents output images. A digital camera driver 104 has been installed as software to transfer data from the digital camera 106 to the OS 102.

Also, the personal computer 100 is equipped with hardware including a hard disk drive (HD) 107, CPU 108, RAM 109, and ROM 110 to provide an environment in which the software described above can operate.

To implement a configuration shown in FIG. 1, for example, the Microsoft's Windows XP (registered trademark) OS is installed on one of IBM AT compatible personal computers which are in general use. A desired printing application is installed on the personal computer 100, which are connected with the digital camera 106 and printer 105. Incidentally, the personal computer 100 may be connected with the digital camera 106 and printer 105 using any method including USB and short-distance wireless communications.

On the personal computer 100, based on a display image presented on the monitor 111, an application 101 creates output image data using text data such as characters as well as original image data such as natural images. To print out the output image data, the application 101 makes a printout request to the OS 102 and issues a drawing command group containing the original image data to the OS 102, the drawing command group being made up of image drawing commands and representing output images. In response to the printout request from the application 101, the OS 102 issues a drawing command group to the printer driver 103 for the printer 105.

On the other hand, the printer driver 103 processes the print request and drawing command group received from the OS 102, and thereby creates data printable on the printer 105 and transfers the data to the printer 105. If the printer 105 is a raster printer, the printer driver 103 performs an image correction process on the drawing commands from the OS 102 in sequence. The printer driver 103 rasterizes the drawing commands in an RGB 24-bit page memory in sequence. After rasterizing all the drawing commands, the printer driver 103 converts the rasterized drawing commands into CMYK or other format printable on the printer 105 and transfers the resulting data to the printer 105.

The image processing system according to the present embodiment is configured to transmit image data from the digital camera 106 to the personal computer 100 because image data obtained mainly by shooting with the digital camera 106 is input in the personal computer 100.

Next, an image processing method for color correction of a facial region will be described, where the color correction of the facial region is performed after an image shot with the digital camera 106 is inputted in the personal computer 100 and color correction is performed on the image.

Image data obtained by shooting with the digital camera 106 is recorded and stored in an SRAM typified by a CF card or SD card. A user can transfer the image data as it is to the HD 107 in the personal computer 100 via the digital camera driver 104. Also, the user performs a correction process on brightness and color of the image data using the image processing software among the applications 101.

Figure 2:
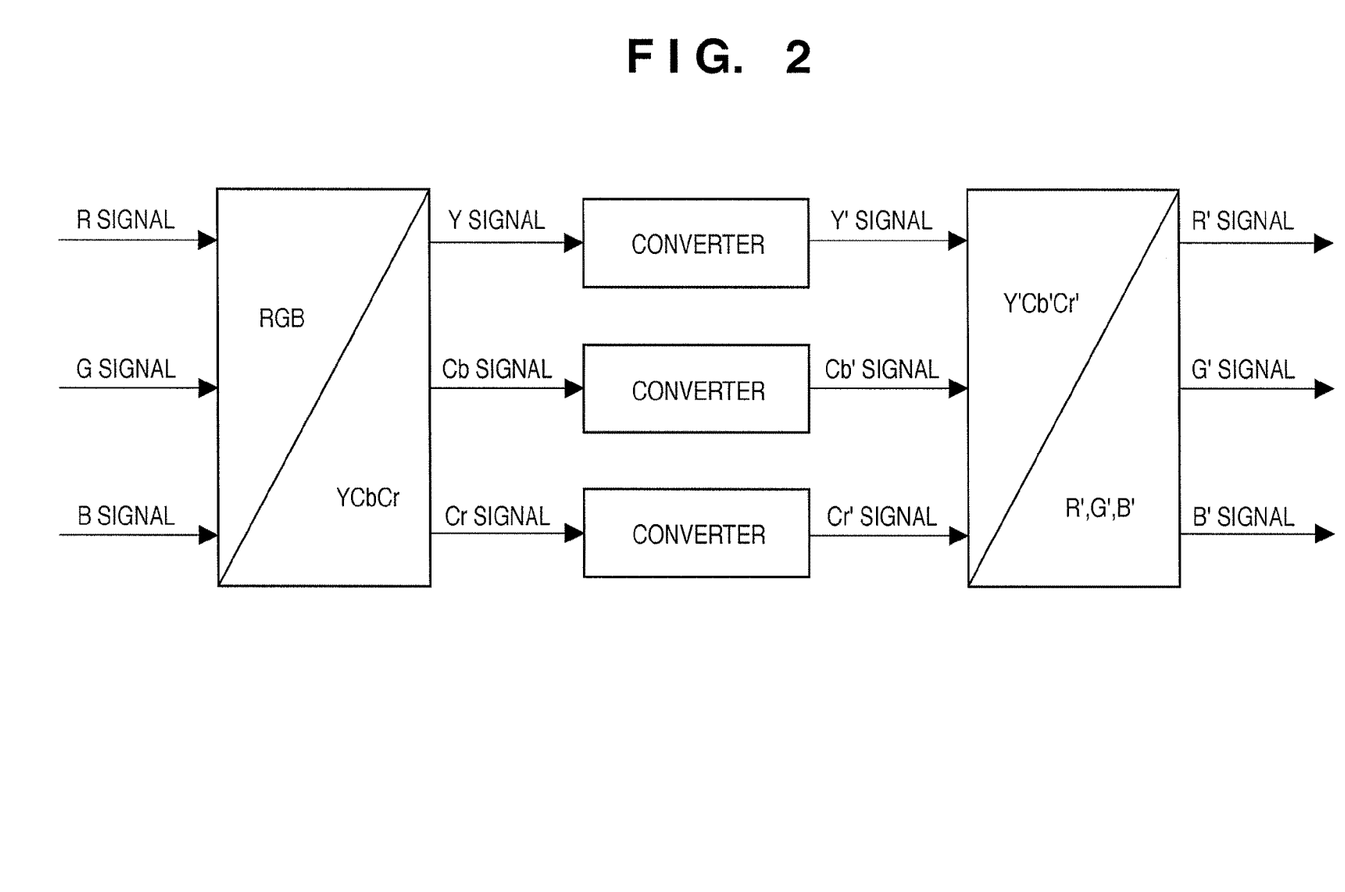
FIG. 2 is a diagram showing conversion from RGB signals into YCbCr signals.

According to the present embodiment, the correction process is performed on luminance and color difference (YCbCr) signals. That is, when performing a correction process on images captured by the digital camera driver 104, the application 101 can directly process JPEG images stored in the form of YCbCr signals. However, in the case of bitmap images and TIFF images, which are stored in the form of RGB signals, the RGB signals are converted into YCbCr signals as shown in FIG. 2. Methods for converting RGB signals into YCbCr signals are known, and detailed description thereof will be omitted.

First, luminance and color difference values (YCbCr) of a highlight point (HLP) and shadow point (SDP) in the YCbCr signals are calculated as respective feature values through an image analysis process.

Figure 3:
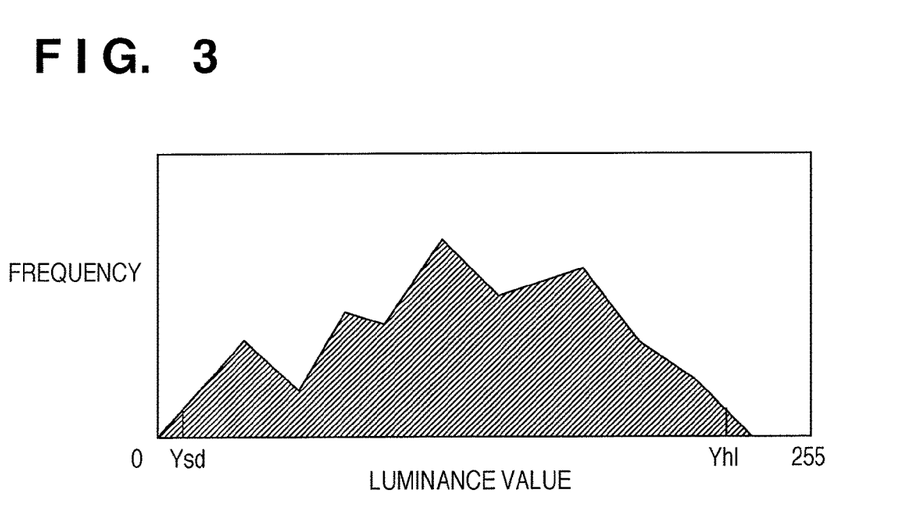
FIG. 3 is a diagram showing an example of a luminance histogram of an image.

This process creates a luminance histogram from the luminance signal of the image data as shown in FIG. 3. This process may be performed with respect to all pixels or the pixels may be skipped at certain intervals. The skipping makes it possible to reduce an amount of data while maintaining characteristics of the histogram.

In the luminance histogram, frequency of the histogram is accumulated from a maximum luminance value (Y=255) toward a low luminance side and a luminance value whose proportion in total pixels exceeds a predetermined threshold is designated as a luminance value Yhl of the HLP. Also, frequency of the histogram is accumulated from a minimum luminance value (Y=0) toward a high luminance side and a luminance value whose proportion in the total pixels exceeds a predetermined threshold is designated as a luminance value Ysd of the SDP. According to the present embodiment, the predetermined threshold is 0.5%, but another value may be used or the threshold may be changed dynamically with the image.

Next, Cb values and Cr values at the HLP and SDP are calculated. All pixels whose luminance value is Yhl are extracted from the pixels in the histogram and the Cb values and Cr values of the pixels are accumulated. The cumulative Cb value and Cr value are divided by the frequency of Yhl to find an average Cb value and average Cr value at Yhl. The average Cb and Cr values are designated as color difference values Cbhl and Crhl. Regarding the SDP, color difference values Cbsd and Crsd are determined in a similar manner.

$$HLP(Yhl, Cbhl, Crhl)$$

$$SDP(Ysd, Cbsd, Crsd)$$

Alternatively, the cumulative Cb value and Cr value may be calculated from all the relevant pixels again after Yhl and Ysd are determined or cumulative color difference values may be prepared for each level of luminance upon creation of the luminance histogram.

The above calculations determine the HLP and SDP of the input image in YCbCr color space. If the two points are located on a gray axis, white balance of the image is generally appropriate. However, if the two points—HLP and SDP—are located off the gray axis, the image is affected by a color cast and is in need of white balance correction.

That is, an image affected by a color cast needs to undergo white balance correction so that the two points—HLP and SDP—will coincide with any points on the gray axis. According to the present embodiment, white balance correction is performed using matrix calculations.

Now, white balance correction by means of matrix calculations will be described in detail. First, a targeted HLP and SDP are determined in advance. YCbCr values of the HLP and SDP are defined as follows.

$$HLP\_target=(Yhlt, Cbhlt, Crhlt)$$

$$SDP\_target=(Ysdt, Cbsdt, Crsdt)$$

Figure 4:
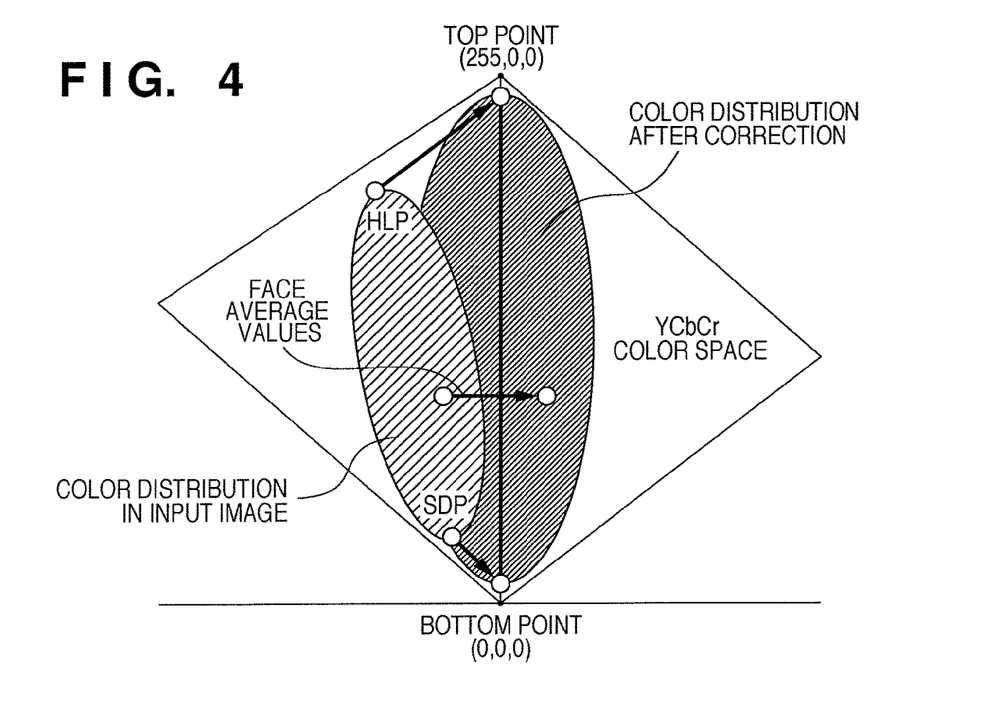
FIG. 4 is a diagram showing an example of white balance correction.

A three-by-three matrix which makes the HLP and SDP match HLP_target and SDP_target, respectively, is determined uniquely. FIG. 4 is a diagram showing white balance correction by means of matrix calculations. By setting the HLP and SDP to their respective target values, it is possible to correct a color cast of the image and thereby set a subject and background to appropriate colors.

The targeted HLP and SDP may be set to the top point (255, 0, 0) and bottom point (0, 0, 0) in the YCbCr color space, but in this case, they are located slightly inside of the top point and bottom point as shown in FIG. 4. In this way, by allowing some latitude in space, it is possible to prevent loss of color detail caused by the matrix calculations.

As described above, the recent advancement in face extraction techniques has made it possible to automatically extract a facial region from an image which show persons. For example, various techniques are available including a technique which extracts faces by filter analysis, technique which extracts flesh-colored regions based on color difference signals, and technique which extracts faces by pattern recognition. According to the present embodiment, although process details of face extraction are omitted, a method for calculating average values (feature values) of a facial region will be described in detail below.

Figure 5:
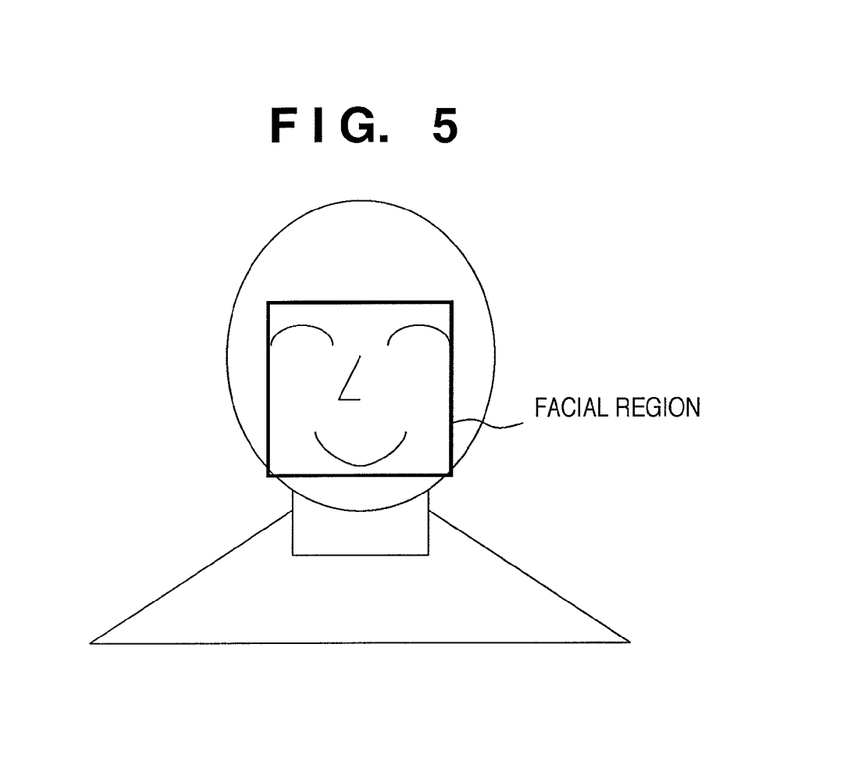
FIG. 5 is a diagram showing an example of a facial region to be extracted.

Incidentally, the facial region may be extracted in the form of a rectangle as shown in FIG. 5. Alternatively, a region containing only flesh color may be extracted by contour extraction.

Figure 6:
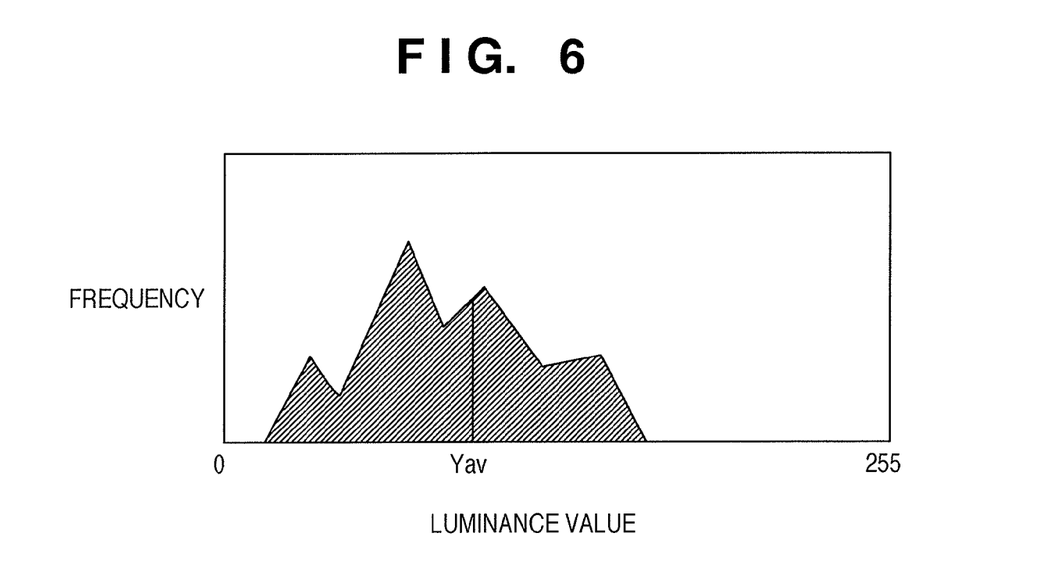
FIG. 6 is a diagram showing an example of a luminance histogram of a facial region.

First, a histogram is created for the extracted facial region as shown in FIG. 6. The histogram of the facial region can be created in the process of creating the histogram of the image described above, by determining whether or not object pixels are located in the facial region and accumulating only the pixels which are located in the facial region.

An average luminance value Yav is determined from the histogram of the facial region. An example of the average luminance value Yav is shown in the histogram in FIG. 6. As with the histogram of the image described above, color difference values are determined at the average luminance value Yav in the facial region. Again, this method determines the average Cb value and average Cr value of a face by dividing the cumulative color difference values at Yav by the frequency in the histogram of the face. Specifically, the face average values are as follows.

Face average values=($Yav, Cbav, Crav$)

Target values for the face are determined in advance, specifically, using values which represent a pleasant average flesh color and serve as a correction target for the face average values. According to the present embodiment, the target values are described as follows.

Target values for face=($Yface, Cbface, Crface$)

The target values for the face may be established by statistically calculating a pleasant flesh color from a plurality of images or may be varied according to the face average values. For example, when the average luminance value Yav is lower than a given threshold, it is possible to prevent extensive correction by decreasing Yface.

Generally, if an image is affected by a color cast, the HLP and face average values are similarly affected by the color cast. Thus, the above-described white balance correction using the HLP should correct the face average values appropriately and bring the face average values close to target values.

Actually, however, depending on color balance characteristics and HLP detection accuracy of the digital camera, white balance correction will not always bring the face average values close to target values. On the contrary, white balance correction may bring the face average values away from the target values.

Therefore, the white balance correction is controlled by determining whether the face average values have approached or departed from the target values after the white balance correction.

The face average values (Yav, Cbav, Crav) are corrected using the matrix described above. The face average values after the correction are designated by (Yav', Cbav', Crav'). If distance between the face average values before the correction and the target values is D_before and distance between the face average values after the correction and the target values is D_after, the following equations are obtained.

$$D\_before = \sqrt{\{(Yface-Yav)^2+(Cbface-Cbav)^2+(Crface-Crav)^2\}} \quad \text{Eq. 1}$$

$$D\_after = \sqrt{\{(Yface-Yav')^2+(Cbface-Cbav')^2+(Crface-Crav')^2\}} \quad \text{Eq. 2}$$

Difference ΔD between the two distances is given by the following equation.

$$\Delta D = D\_before - D\_after \quad \text{Eq. 3}$$

If ΔD is a positive value, the correction has brought the face average values close to the target values, meaning that the white balance correction is successful. On the other hand, if ΔD is a negative value, the correction has brought the face average values away from the target values, meaning that the white balance correction may be unsuccessful.

Thus, magnitude of the correction needs to be varied according to the value of ΔD. If ΔD is a negative value, an amount of white balance correction is multiplied by a first modification coefficient k1(ΔD) which is a function of ΔD. The magnitude of the white balance correction is decreased with decreases in ΔD. The first modification coefficient k1(ΔD) is set to 0 when ΔD is equal to or smaller than a predetermined value. Hereinafter, the first modification coefficient k1(ΔD) will be referred to simply as the modification coefficient k1(ΔD).

Figure 7:
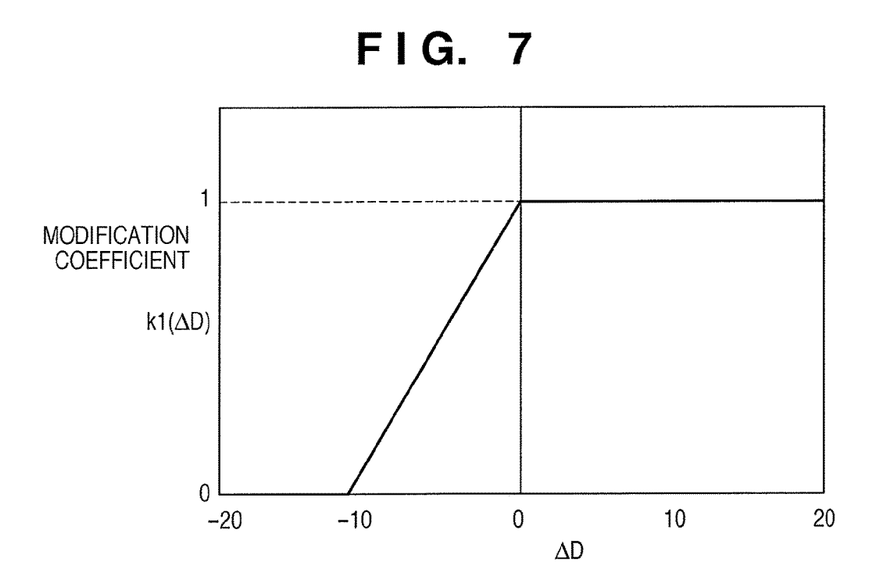
FIG. 7 is a diagram showing a relationship between a distance difference $\Delta D$ and modification coefficient $k1(\Delta D)$.

FIG. 7 is a diagram showing a relationship between the distance difference ΔD and modification coefficient k1(ΔD). When ΔD is a positive value, since the white balance correction can be applied directly as described above, the modification coefficient k1(ΔD) is set to 1. The modification coefficient k1(ΔD) is also set to 1 when ΔD=0. This is because it is necessary to perform white balance correction to correct the color cast of the image even if there is no need to bring the face average values close to the target values by correction.

On the other hand, when ΔD is a negative value, the magnitude of the white balance correction is decreased from 1 until eventually it is 0. This is because if the modification coefficient k1(ΔD) is set to 0 at once when ΔD becomes negative, values of the modification coefficient k1(ΔD) becomes discontinuous, changing the extent of correction suddenly. For example, in the case where there are a plurality of similar images in which ΔD is near 0, if the modification coefficient k1(ΔD) were set to 0 at once, some of the images would be corrected while the rest of the images would remain uncorrected. Incidentally, in the example shown in FIG. 7, the modification coefficient k1(ΔD)=0 when ΔD=−20.

Also, as described above, if the color balance characteristics of the digital camera are not accurate, the color balance between the HLP and flesh color may not be right. Therefore, even if white balance correction does not bring the flesh color close to target values, this does not necessarily mean that the white balance correction is inappropriate.

To deal with this problem, according to the present embodiment, the modification coefficient k1(ΔD) has a finite value even when the value of ΔD is negative, and becomes 0 at a predetermined point (ΔD=−20 in FIG. 7). That is, no white balance correction is performed when ΔD=−20. This allows some latitude in determining face average values in white balance correction, making it possible to deal with the problems of unequal correction results among similar images and color balance inaccuracy and error in input images.

A matrix coefficient determined earlier is multiplied by the modification coefficient k1(ΔD) to obtain the amount of white balance correction. Corrected pixel values can be calculated by multiplying pre-correction pixel values by the amount of white balance correction thus obtained.

Alternatively, corrected pixel values may be determined by multiplying difference between the pixel values before and after white balance correction by the modification coefficient k1(ΔD) and adding the product to the pre-correction pixel values. That is, this method multiplies changes made by the matrix-based correction by the modification coefficient k1(ΔD) instead of directly multiplying the matrix coefficient by the modification coefficient k1(ΔD). Specifically, if the pre-correction pixel values are (YCbCr) and the pixel values after the white balance correction are (YCbCr)', the final pixel values (YCbCr)" by the application of the modification coefficient k1(ΔD) are given by the following equations.

$$Y''=Y+(Y'-Y)*k1(\Delta D) \quad \text{Eq. 4}$$

$$Cb''=Cb+(Cb'-Cb)*k1(\Delta D) \quad \text{Eq. 5}$$

$$Cr''=Cr+(Cr'-Cr)*k1(\Delta D) \quad \text{Eq. 6}$$

The amount of white balance correction (extent of correction) is controlled by modifying the difference resulting from the white balance correction with the modification coefficient k1(ΔD).

As described above, the white balance correction of the image is performed by means of matrix calculations using the HLP and SDP of the image. Subsequently, it is determined whether the white balance correction brings the face average values close to the target values. Then, the modification coefficient k1(ΔD) is calculated to control the amount of white balance correction (extent of correction). At his stage, however, the face average values do not necessarily coincide with the target values. Thus, luminance correction and color correction are applied to the face average values to bring the face average values into coincidence with the target values.

The face average values and target values for the face are designated by (Yav", Cbav", Crav") and (Yface, Cbface, Crface), respectively. First, Yav" is brought into coincidence with Yface by luminance correction. The luminance correction can be performed simply by using a tone curve.

Figure 8:
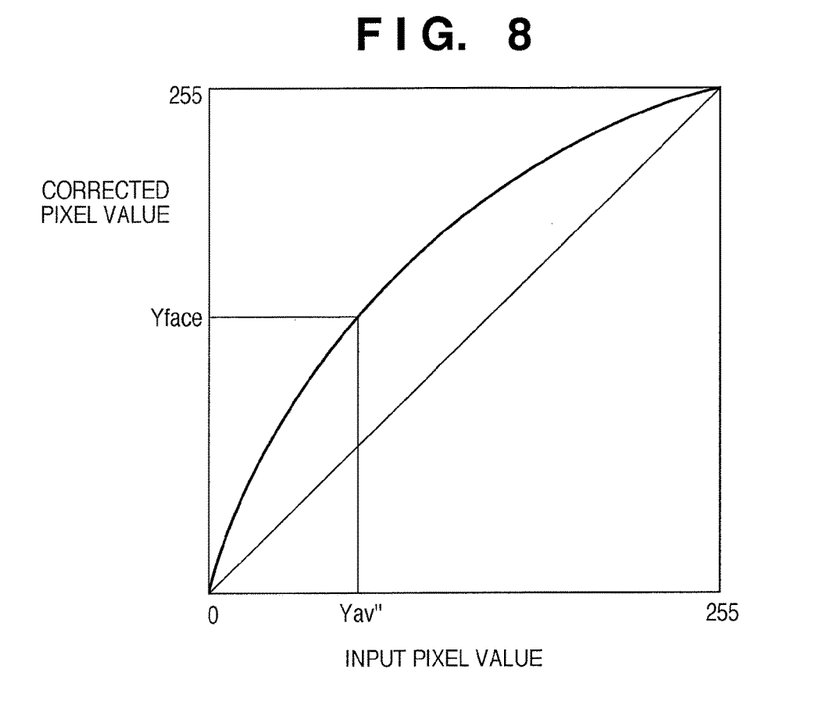
FIG. 8 is a diagram showing a relationship of a tone curve with Yav" and Yface.

FIG. 8 is a diagram showing a relationship of a tone curve with Yav" and Yface. According to the present embodiment, gamma correction is performed by determining a gamma value as follows.

$$\gamma=\log(Yav'')/\log(Yface) \quad \text{Eq. 7}$$

$$y'=255*\{(y/255)\gamma\} \quad \text{Eq. 8}$$

Luminance correction is performed on all the pixels using a tone curve represented by Eq. 8 above. When luminance correction is performed on the image, non-facial regions are corrected as well, but the luminance of the image changes uniformly, maintaining luminance balance between the facial region—which is a main subject—and background region.

Next, color correction of the face average values is performed. The color correction is performed to bring the face average color difference values (Cbav", Crav") subjected to the luminance correction into coincidence with the target values (Cbface, Crface) for the face. A method for vector correction in a color difference plane will be described here. The vector correction involves adding an amount of vector correction to the face average color difference values (Cbav", Crav") and thereby making the face average color difference values match the target values for the face. The amount of vector correction (ΔCb, ΔCr) is given by the following equations.

$$\Delta Cb=Cb\text{face}-Cbav'' \quad \text{Eq. 9}$$

$$\Delta Cr=Cr\text{face}-Crav'' \quad \text{Eq. 10}$$

Figure 9:
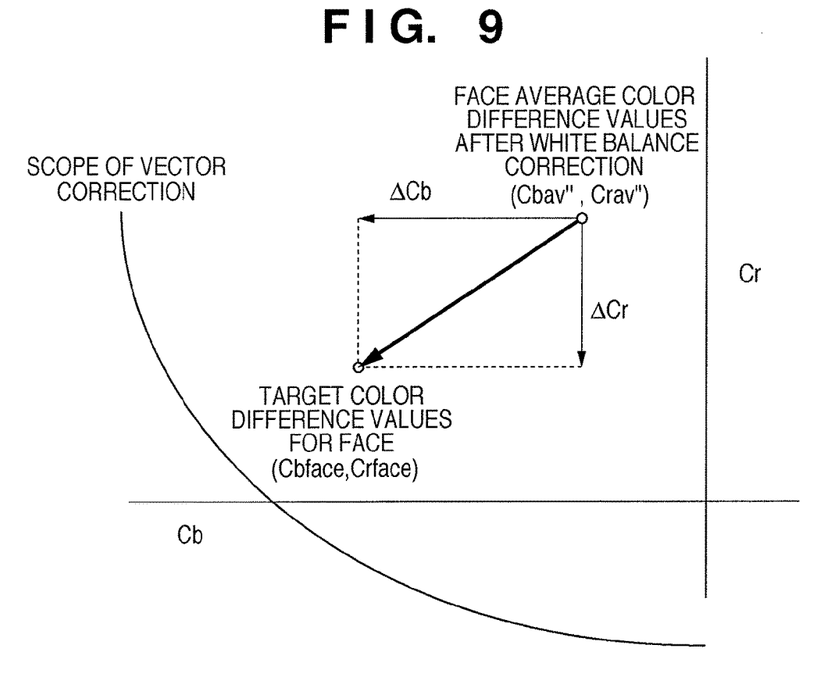
FIG. 9 is a diagram for illustrating a method for vector correction in a color difference plane.

As shown in FIG. 9, by adding the amount of vector correction to the pixel values, it is possible to perform color difference correction without affecting the luminance. Alternatively, ΔCb and ΔCr may be multiplied by the modification coefficient k1(ΔD) described above. That is, since both the white balance correction and vector correction involve adding a tint to the facial region, by multiplying not only the white balance correction, but also the vector correction by the modification coefficient k1(ΔD), it is possible to reduce errors in color correction. In this case, ΔCb and ΔCr are given by $$\Delta Cb=(Cb\text{face}-Cbav'')*k1(\Delta D) \quad \text{Eq. 11}$$

$$\Delta Cr=(Cr\text{face}-Crav'')*k1(\Delta D) \quad \text{Eq. 12}$$

This makes it possible to perform appropriate color correction on the facial region by modifying the amount of white balance correction (amount of color correction) of the facial region according to the target values for the face as well as to the face average color difference values obtained before and after the white balance correction (before and after the correction of the image). Specifically, when the white balance correction brings the face average color difference values close to the target face color difference values, face color correction is performed such that the face average color difference values will match the target values for the face. When the white balance correction brings the face average color difference values away from the target face color difference values, the extent of face color correction is reduced.

Alternatively, the correction may be performed based on the face average luminance values obtained before and after the white balance correction and on the target face luminance values.

However, if the vector correction is performed on the image, the regions corrected by the white balance correction performed earlier will also be affected. A nearly white subject, in particular, will be colored to the extent proportionate to the amount of vector correction, resulting in degraded image quality of the image. In that case, for example, white clouds can become flesh-colored. Such a negative effect (particularly on a highlight region in the image) can be avoided by varying the amount of vector correction according to luminance. A method for that will be described below.

The face which is a main subject in the image is corrected to an appropriate color by bringing the face average color difference values (Cbav", Crav") into coincidence with the target values (Cbface, Crface). The other regions (particularly a highlight region) are protected from being affected by the color difference correction targeted exclusively at flesh color.

For that, the amount of vector correction is modified according to luminance such that the vector correction will be applied to the facial region and reduced in a highlight portion. A modification coefficient according to luminance is designated as a second modification coefficient k2(Y). The amount of vector correction at a given luminance value is calculated by multiplying (ΔCb, ΔCr) by k2(Y). Hereinafter, the second modification coefficient k2(Y) will be referred to simply as the modification coefficient k2(Y).

Figure 10:
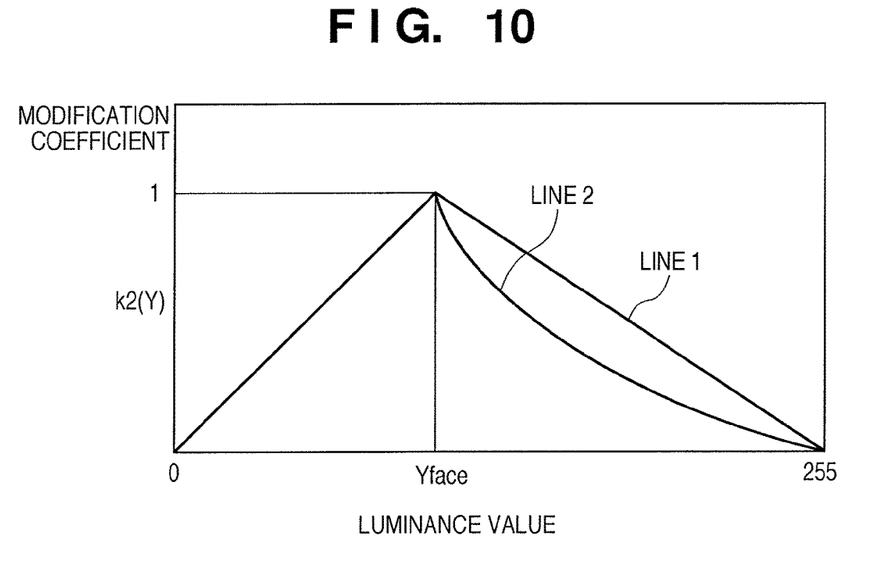
FIG. 10 is a diagram showing an example of a coefficient used to modify an amount of vector correction according to luminance.

FIG. 10 is a diagram showing an example of a coefficient used to modify the amount of vector correction according to luminance. Specifically, in order to fully apply the vector correction to the facial region and not to apply the vector correction to the highlight region, the modification coefficient k2(Y)=1 is used for the target face luminance value Yface and the modification coefficient k2(Y)=0 is used for the maximum luminance value (Y=255).

When the luminance correction of the face is finished, the face average values are (Yface, Cbav", Crav"). Color correction is performed such that this point will coincide with the target values for the face (Yface, Cbface, Crface). Specifically, (ΔCb, ΔCr) in Eq. 10 (or Eq. 11 or 12) are added to the face average color difference values such that (Cbav", Crav") will match (Cbface, Crface) when the face luminance value is Yface. That is, the color difference values (ΔCb, ΔCr) are added to the pixels whose luminance value is Yface such that the modification coefficient k2(Y)=1 at the face luminance value Yface.

On the other hand, it is considered that further deviations from Yface of a luminance value of a pixel of interest corresponds to a further distance between the pixel of interest and the facial region. Also, when the pixel of interest is close to the highlight region, the color difference value of the pixel of interest becomes smaller, and the amount of vector correction has a larger effect. Therefore, the modification coefficient k2(Y) is reduced according to the distance from Yface to reduce the amount of vector correction in the non-facial regions and highlight region. In FIG. 10, Yface and the maximum luminance value (Y=255) are connected by a straight line represented by line 1 to indicate appropriate values of the modification coefficient k2(Y).

In this way, by varying the modification coefficient k2(Y) continuously, it is possible to perform color correction while eliminating false contours. If the pixel values after the white balance correction are (YCbCr)', the final pixel values (YCbCr)" are given by the following equations.

$$Y''=255*\{(y'/255)\gamma\} \quad \text{Eq. 13}$$

$$Cb''=Cb'+\Delta Cb*k2(Y') \quad \text{Eq. 14}$$

$$Cr''=Cr'+\Delta Cr*k2(Y') \quad \text{Eq. 15}$$

The modification coefficient k2(Y) in the range from Yface to the maximum luminance value is as described above. In the range from Yface to the minimum luminance value (Y=0), no particular limit is imposed according to the present embodiment. A shadow region, if colored more or less, will not stand out so much as a highlight region and will not undergo substantial degradation of image quality. Although the modification coefficient k2(Y) at the minimum luminance value (Y=0) is assumed to be 0 in FIG. 4, it may be a finite value.

Description has been given above of how to perform vector correction using the modification coefficient k2(Y) in such a way as not to upset the color balance in the highlight region which has undergone white balance correction. Particularly if the HLP is detected with high accuracy, vector correction should not be performed on the highlight region. Thus, the highlight region of the modification coefficient k2(Y) shown in FIG. 10 may be adjusted using ΔD which represents the HLP detection accuracy. For example, when ΔD is a negative value, the modification coefficient k2(Y) becomes a straight line represented by line 1 in FIG. 10. When ΔD is a positive value, the modification coefficient k2(Y) becomes a curved line represented by line 2, with decreased values in the highlight region.

That is, if the face average values determined by matrix calculations based on the HLP approach the target values (ΔD>0), it can be said that the HLP is detected properly and consequently that white balance correction is successful.

Thus, in order to maintain color balance, it is necessary to reduce the effect of vector correction in the highlight region which has undergone proper white balance correction. For that, by decreasing the modification coefficient k2(Y) represented by line 2 in FIG. 10, it is possible to reduce the amount of vector correction.

According to another embodiment, a scope of vector correction is set during color correction of a facial region. If color correction for appropriate correction of flesh color is applied to regions other than flesh-colored regions (e.g., the blue sky or green trees and plants), the image quality of the image will be degraded. To deal with this, a circle of any desired radius with a center at the face average color difference values (Cbav", Crav") obtained by the white balance correction can be created in the color difference plane and the inside of the circle can be designated as the scope of the vector correction.

In FIG. 9, the region to the upper right of the circular arc corresponds to the scope. The circle has a radius larger than the correction vector (thick line). The amount of vector correction is a maximum at the center (Cbav", Crav"), decreases with increasing distance from the center, and becomes 0 on the circular arc.

As described above, by establishing a scope, it is possible to apply the vector correction only to flesh color and keep the vector correction from affecting the regions other than the flesh-colored regions. Also, by making the circle larger than vector quantity in FIG. 9, it is possible to prevent color inversion. Also, by decreasing the amount of vector correction along a gentle curve with increasing distance from the center of the circle, it is possible to eliminate false contours.

According to another embodiment, reliability of a detected face (face detection reliability) may be determined at the time of face detection and may be used to control the amount of correction. If the face detection reliability is high, the correction can be applied positively. On the other hand, if the face detection reliability is low, there is a high probability of false detection, and thus it is necessary to decrease the magnitude of correction.

Thus, in the three types of correction (white balance correction, luminance correction of the face, and face color correction) described above, the amount of correction is multiplied by the face detection reliability (0 to 100%). That is, when face detection reliability is 100%, the amount of correction obtained is used as it is for the correction. When face detection reliability is, for example, 70%, the amount of correction obtained is multiplied by 70% to reduce the correction. This makes it possible to reduce false detection and perform optimum correction.

According to the embodiments described above, after the white balance correction of the image, luminance correction and color correction are performed in such a way as to make the face average values match the target values for the face. In so doing, the magnitude of correction is controlled using the first modification coefficient k1(ΔD) and second modification coefficient k2(Y).

Figure 11:
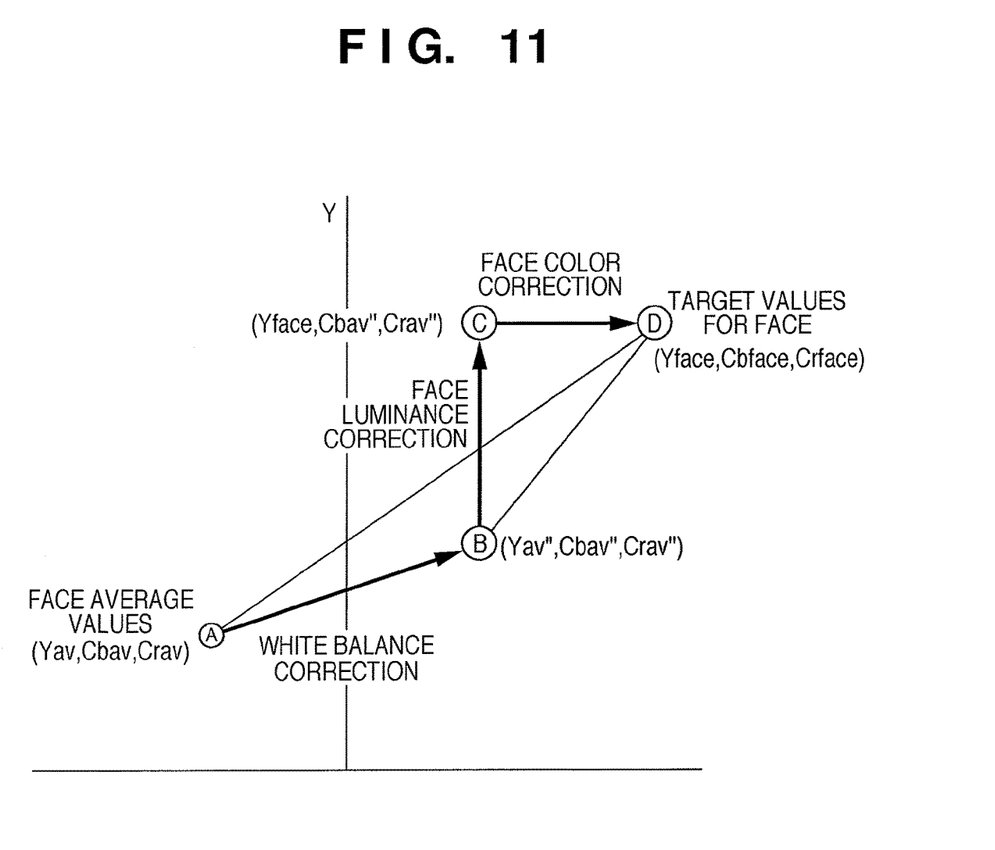
FIG. 11 is a diagram for illustrating an overall flow of a correction process.

FIG. 11 is a diagram for illustrating an overall flow of a correction process. In FIG. 11, point A represents the face average values detected before correction. Point B represents the face average values obtained after white balance correction performed using matrix calculations and the modification coefficient k1(ΔD). Point C represents the face average values obtained after luminance correction performed using a tone curve. Point D represents the face average values obtained after color correction performed using vector correction.

First, matrix calculations are performed to correct a color cast of the image using the HLP and SDP. It is assumed that point A is corrected to point B by the matrix calculations. Distance (line segment ΔD) between the face average values and the target values for the face before the correction is compared with distance (line segment BD) between the corrected face average values and the target values for the face. If point B comes closer to point A than to point D as a result of the matrix calculations or point B is at an equal distance from point A and point D, white balance correction is performed directly as shown in FIG. 7. If point B is farther from point A than point D, the magnitude of white balance correction is decreased through multiplication by the modification coefficient k1(ΔD).

Next, luminance correction is performed to make the face average values match the target luminance values for the face. Point B can be moved to point C by the application of a tone curve such as shown in FIG. 8. Since only luminance is corrected, the highlight region is not colored.

Finally, color correction is performed to make the face average color difference values match the target color difference values for the face. The amount of vector correction such as shown in FIG. 9 is determined and the correction is performed using the modification coefficient k1(ΔD) shown in FIG. 7 and modification coefficient k2(Y) shown in FIG. 10. Besides, characteristics of the modification coefficient k2(Y) may be changed according to the value of ΔD, as exemplified by line 1 and line 2 in FIG. 10.

Furthermore, a scope of face color correction may be specified and the vector correction may be performed within the specified scope. Also, the reliability of the detected face may use used to control the magnitude of correction.

In this way, the use of face average values makes it possible to perform optimum color correction on the facial region and highlight region by controlling the amounts of correction of the image and facial region.

The present invention may be applied either to a system consisting of two or more apparatus (e.g., a host computer, interface devices, a reader, a printer, and the like) or to equipment consisting of a single apparatus (e.g., a copier, a printer, a facsimile machine, or the like).

The object of the present invention can also be achieved by a recording medium containing software program code that implements the functions of the above embodiment: the recording medium is supplied to a system or apparatus, whose computer (or a CPU or MPU) then reads the program code out of the recording medium and executes it.

In that case, the program code itself read out of the computer-readable recording medium will implement the functions of the above embodiment, and the recording medium which stores the program code will constitute the present invention.

Examples of the recording medium used to supply the program code include, for example, a flexible disk, hard disk, optical disk, magneto-optical disk, CD-ROM, CD-R, magnetic tape, non-volatile memory card, and ROM.

Also, the functions of the above embodiment can be implemented not only by the program code read out and executed by the computer, but also by part or all of the actual processing executed according to instructions from the program code by an OS (operating system) running on the computer.

Furthermore, the functions of the above embodiment can also be implemented by part or all of the actual processing executed by a CPU or the like contained in a function expansion card inserted in the computer or a function expansion unit connected to the computer if the processing is performed according to instructions from the program code that has been read out of the recording medium and written into memory on the function expansion card or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-210296, filed on Aug. 10, 2007, which is hereby incorporated by reference herein in its entirety.

What is claimed is:

1. An image processing apparatus that performs white balance correction and color correction of an image comprising one or more processors configured to function as:
   a generation unit configured to generate, based on a feature amount of an image, a correction parameter for white balance correction reducing a color cast in an image;
   a correction unit configured to perform white balance correction of the image by using the correction parameter generated by the generation unit, and color correction for correcting a feature amount of a facial region in the image to be close to a predetermined target feature amount; and
   wherein the correction unit determines the extent of the color correction for correcting the feature amount of a facial region in the image in accordance with a result of the white balance correction performed on the image so as to decrease the color correction amount for correcting the feature amount of a facial region in the image or not to correct the feature amount of the facial region when a second distance is longer than a first distance in a feature amount plane, wherein the first distance indicates a distance between a feature amount of the facial region obtained before the white balance correction and the predetermined target feature amount, and the second distance indicates a distance between a feature amount of the facial region obtained after the white balance correction and the predetermined target feature amount.

2. The image processing apparatus according to claim 1, wherein the feature amount of the image is luminance and color difference value of a highlight point and a shadow point of the image.

3. The image processing apparatus according to claim 1, wherein the feature amount of the facial region is an average color difference value of the facial region.

4. An image processing apparatus in accordance with claim 1 wherein:
the correction unit performs white balance correction of the image by adjusting a highlight point and a shadow point in the image to be close to predetermined target values on a gray axis; and
the correction unit performs color correction for correcting the feature amount of a facial region in the image to be close to the predetermined target feature amount by adjusting average color difference values in the facial region to be close to predetermined target color values.

5. The image processing apparatus according to claim 1, wherein the correction amount of the color correction for the facial region is controlled by a luminance value of the facial region obtained after the white balance correction.

6. The image processing apparatus according to claim 1, wherein the correction amount of the color correction for the facial region is controlled so that the correction amount is maximized at the average luminance value of the facial region obtained after the color correction.

7. The image processing apparatus according to claim 1, wherein the predetermined target feature amount indicates a target value for color difference of the facial region.

8. The image processing apparatus according to claim 1, wherein the feature amount plane is a color difference plane.

9. The image processing apparatus according to claim 1, wherein the correction parameter is a matrix.

10. The image processing apparatus according to claim 1, wherein the correction unit sets a circle of a predetermined radius with a center at the average color difference value of the facial region obtained after the white balance correction in a color difference plane, and designates the inside of the circle as the scope of the color correction.

11. The image processing apparatus according to claim 10, wherein the correction amount of the color correction for the facial region is decreased with increasing distance from the center of the set circle.

12. An image processing method performed by an image processing apparatus that performs white balance correction and color correction of an image, comprising the steps of:
generating, based on a feature amount of an image, a correction parameter for white balance correction reducing a color cast in an image;
correcting white balance of the image by using the correction parameter generated by the generation step, and performing color correction for correcting a feature amount of a facial region in the image close to a predetermined target feature amount; and
determining the extent of the color correction for correcting the feature amount of a facial region in the image in accordance with a result of correcting the white balance performed on the image, so as to decrease the correction amount for correcting the feature amount of a facial region in the image or not to correct the feature amount of the facial region when a second distance is longer than a first distance in a feature amount plane, wherein the first distance indicates a distance between a feature amount of the facial region obtained before the white balance correction and the predetermined target feature amount, and the second distance indicates a distance between a feature amount of the facial region obtained after the white balance correction and the predetermined target feature amount.

13. A non-transitory computer-readable storage medium storing a computer program for causing a computer to function as an image processing apparatus that performs white balance correction and color correction of an image and comprising one or more processors configured to function as:
a generation unit configured to generate, based on a feature amount of an image, a correction parameter for white balance correction reducing a color cast in an image;
a correction unit configured to perform white balance correction of the image by using the correction parameter generated by the generation unit, and color correction for correcting a feature amount of a facial region in the image close to a predetermined target feature amount; and
wherein the correction unit determines the extent of the color correction for correcting the feature amount of a facial region in the image in accordance with a result of the white balance correction performed on the image so as to decrease the color correction amount for correcting the feature amount of a facial region in the image or not to correct the feature amount of facial region when a second distance is longer than a first distance in a feature amount plane, wherein the first distance indicates a distance between a feature amount of the facial region obtained before the white balance correction by and the predetermined target feature amount, and the second distance indicates a distance between a feature amount of the facial region obtained after the white balance correction and the predetermined target feature amount.

* * * * *